US008918662B2

(12) United States Patent
Root et al.

(10) Patent No.: US 8,918,662 B2
(45) Date of Patent: Dec. 23, 2014

(54) SYSTEM TIMEOUT RESET BASED ON MEDIA DETECTION

(75) Inventors: Michael A. Root, Waukegan, IL (US); Ansuman Tapan Satpathy, Sunnyvale, CA (US); Haitang Wang, Sunnyvale, CA (US)

(73) Assignee: Motorola Mobility LLC, Libertyville, IL (US)

( * ) Notice: Subject to any disclaimer, the term of this patent is extended or adjusted under 35 U.S.C. 154(b) by 741 days.

(21) Appl. No.: 12/984,224

(22) Filed: Jan. 4, 2011

(65) Prior Publication Data

US 2012/0173890 A1 Jul. 5, 2012

(51) Int. Cl.
| | |
|---|---|
| *G06F 1/26* | (2006.01) |
| *G06F 1/32* | (2006.01) |
| *G06F 1/16* | (2006.01) |
| *G06F 3/14* | (2006.01) |
| *G09G 5/00* | (2006.01) |

(52) U.S. Cl.
CPC ............... *G06F 3/14* (2013.01); *G06F 1/1632* (2013.01); *G09G 5/006* (2013.01); *G09G 2320/046* (2013.01); *G06F 1/3215* (2013.01); *G09G 2370/12* (2013.01)
USPC ............. 713/320; 713/300; 713/323; 710/15; 710/17; 710/18

(58) Field of Classification Search
CPC .................. H04N 2201/0049; H04N 21/2368; H04N 9/8211; G09G 5/006; G09G 2370/12; G09G 2330/021; G09G 2330/022; G06F 3/14; G06F 1/3265; G06F 1/3218
USPC ................. 713/300, 320, 323; 710/15, 17, 18
See application file for complete search history.

(56) References Cited

U.S. PATENT DOCUMENTS

| | | | | |
|---|---|---|---|---|
| 5,617,572 | A | * | 4/1997 | Pearce et al. .................. 713/323 |
| 6,018,803 | A | | 1/2000 | Kardach |
| 6,404,423 | B1 | * | 6/2002 | Kivela et al. .................. 345/212 |
| 8,421,277 | B2 | * | 4/2013 | Luck et al. ..................... 307/140 |
| 2004/0049705 | A1 | | 3/2004 | Liebenow |
| 2007/0257900 | A1 | | 11/2007 | Schulz |
| 2008/0036918 | A1 | | 2/2008 | Huang |

(Continued)

FOREIGN PATENT DOCUMENTS

WO 2010023796 A1 4/2010

OTHER PUBLICATIONS

Patent Cooperation Treaty, "International Search Report and Written Opinion of the International Searching Authority", for Int'l Application No. PCT/US2011/068017, Mar. 20, 2012, 16 pages.

(Continued)

*Primary Examiner* — Jaweed A Abbaszadeh
(74) *Attorney, Agent, or Firm* — Byrne Poh LLP

(57) ABSTRACT

In embodiments of system timeout reset based on media detection, an electronic device includes an interface connection that couples the electronic device to a peripheral. A power manager application is implemented to timeout the interface connection if user interaction with the electronic device is not detected for a timeout duration. A media data monitor is implemented to detect audio data in an audio channel of the interface connection, and initiate a reset of the timeout duration responsive to the audio data being detected. Video can continue to be rendered by the peripheral if the audio data is detected to initiate the reset of the timeout duration.

18 Claims, 5 Drawing Sheets

(56) References Cited

U.S. PATENT DOCUMENTS

| | | | |
|---|---|---|---|
| 2008/0106537 A1* | 5/2008 | Chiu | 345/211 |
| 2008/0170058 A1* | 7/2008 | Ahn et al. | 345/211 |
| 2009/0082066 A1 | 3/2009 | Katz | |
| 2009/0102971 A1* | 4/2009 | Chang et al. | 348/554 |
| 2010/0250985 A1* | 9/2010 | Gupta | 713/323 |
| 2011/0154270 A1* | 6/2011 | Sonoda et al. | 715/867 |

OTHER PUBLICATIONS

Joshua D. Galicia et al., Multi-Environment Operating System, U.S. Appl. No. 12/838,868, filed Jul. 19, 2010.

Joshua D. Galicia et al., Multi-Environment Operating System, U.S. Appl. No. 12/839,193, filed Jul. 19, 2010.

* cited by examiner

SYSTEM TIMEOUT RESET BASED ON MEDIA DETECTION

BACKGROUND

Computer devices, mobile phones, and other electronic devices are increasingly used to watch movies and videos, such as from a DVD or when streamed from an Internet television service. Unlike watching a movie on a television, however, a user may be passively watching a movie on his or her computer or mobile phone when a screensaver application running on the device automatically activates, and interrupts what the user was watching. The screensaver may turn off the device monitor, suspend activity and processing on the device, and/or initiate displaying different content, such as a background image. A screensaver application is useful for power savings, particularly for battery-powered electronic devices, and a screensaver is typically designed to activate after a designated period of time and when there does not appear to be any user interaction with the device.

Currently, when a user is watching a movie and before the screensaver activates, the user can move a mouse or press a device key to reset the screensaver timeout. However, having to move the mouse every so often to avoid having a movie interrupted may be frustrating for a user, particularly if the mouse input inadvertently initiates a hyperlink causing further interruption of user enjoyment and creating a negative user experience. Optionally, a user can navigate into device settings and turn the screensaver application off, or set the timeout duration for a longer period of time, such as two hours or more, so that a movie is not likely to be interrupted by the screensaver timing out. However, a drawback to manually turning the screensaver application off, or setting the timeout duration for a long period of time, is that power may not be conserved after the movie is over. A battery-powered device in particular may unexpectedly deplete the battery if the user forgets to return the screensaver application to the previous, power-saving settings when the user has finished watching the movie or television show.

BRIEF DESCRIPTION OF THE DRAWINGS

Embodiments of system timeout reset based on media detection are described with reference to the following drawings. The same numbers are used throughout the drawings to reference like features and components.

DETAILED DESCRIPTION

In embodiments of system timeout reset based on media detection, an electronic device, such as a portable computer or mobile phone, couples to a peripheral via an interface connection. A peripheral may include a display monitor that displays video and/or audio speakers that render audio. The interface connection that couples the peripheral and the electronic device may be a high-definition multimedia interface (HDMI), or any other type of audio/video media connector or combination of connectors.

In an example, a user may be watching a video on a display monitor of a peripheral. The video data for the video, along with corresponding audio data, can be communicated from an electronic device to the peripheral via an HDMI connector. The video, along with the audio, plays through an application on the electronic device. However, as described above in the Background section, a screensaver application or other power savings application or manager running on the device may automatically activate and interrupt the video after a designated period of time without user interaction with the electronic device. In an embodiment of system timeout reset based on media detection, a media data monitor (e.g., a software application) detects the audio data in an audio channel of the HDMI connector, and/or detects the audio data at an input or output port of the electronic device. The media data monitor then initiates a reset of a timeout duration so that the interface connection is maintained and the video can continue being displayed by the peripheral, along with continued audio playback.

The detection of the audio data is used as the basis to reset the timeout duration and prevent a screensaver application or other power savings manager from activating when video is being displayed. A user no longer has to periodically move a mouse or provide some other user input to the electronic device to reset a screensaver or power savings timeout, or provide an input to preclude an interruption of the video that is being displayed for viewing. The detected audio data is treated (or appears as) continuous user interaction with the electronic device, and subsequently, the timeout duration is not exceeded (or does not expire) while the video and corresponding audio is rendered. Additionally, the user does not have to navigate menus and manually adjust power saving and/or screensaver settings on the electronic device.

While features and concepts of system timeout reset based on media detection can be implemented in any number of different devices, systems, and/or configurations, embodiments of system timeout reset based on media detection are described in the context of the following example devices, systems, and methods.

Figure 1:
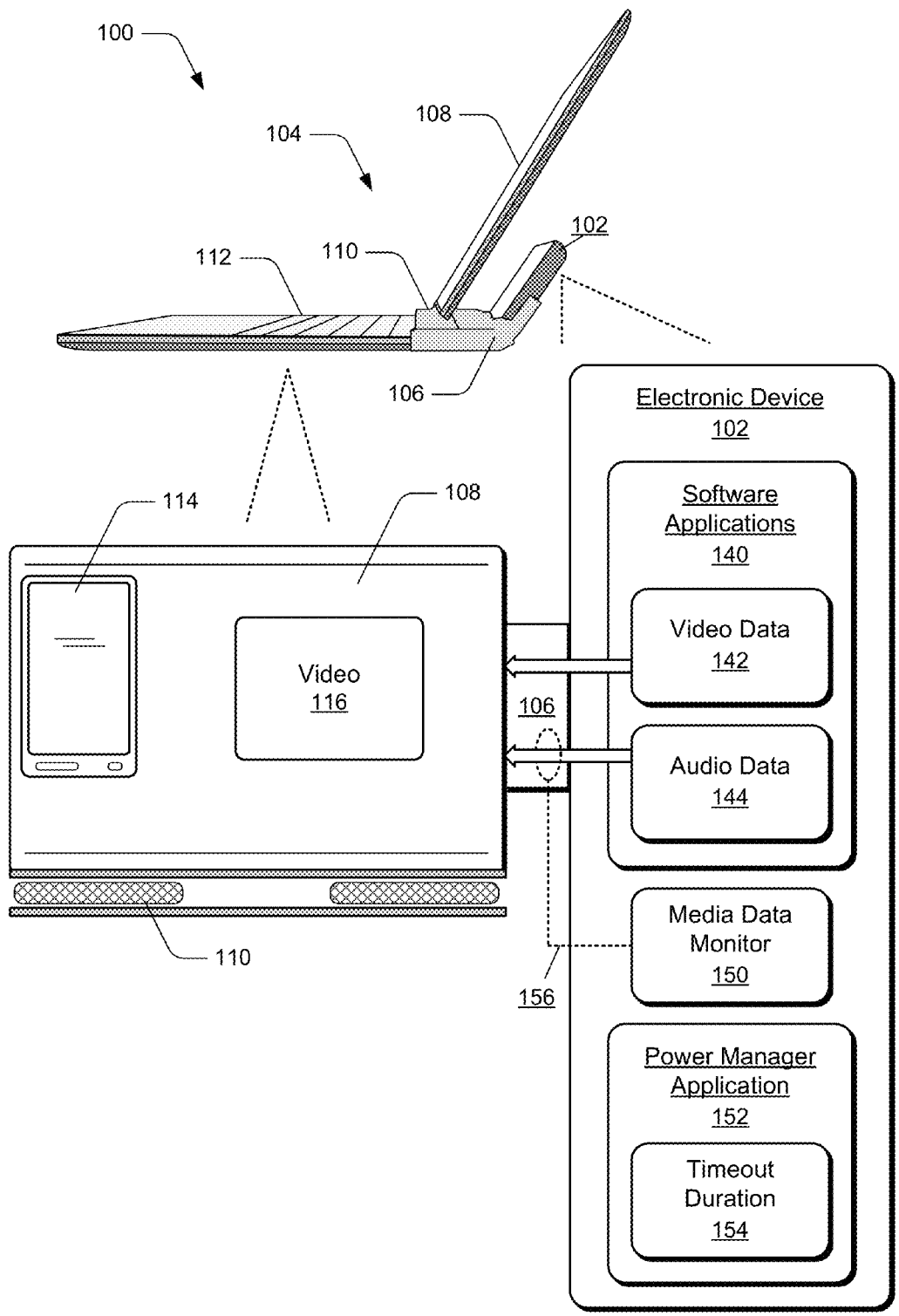
FIG. 1 illustrates an example system in which embodiments of system timeout reset based on media detection can be implemented.

FIG. 1 illustrates an example system 100 in which embodiments of system timeout reset based on media detection can be implemented. The example system 100 includes an electronic device 102 that can be coupled to a peripheral 104 via an interface connection 106. The electronic device can be any one or combination of a fixed or mobile device, in any form of a desktop computer, portable computer, tablet computer, mobile phone, media player, eBook, navigation device, gaming system, gaming controller, remote controller, digital camera, video camera, etc. The peripheral can be implemented to include any one or combination of a display monitor 108, loudspeakers 110 (e.g., integrated speakers or independent components), or any other type of user interface components for electronic device output. Alternatively or in addition, the peripheral can include other user interface components for electronic device input, such as a keyboard 112, a mouse or other pointing device, a touchpad, a touch-screen, a microphone, or any other type of device inputs. The electronic device and/or the peripheral can be implemented with any combination of differing components as further described with reference to the example electronic device 202 shown in FIG. 2, and/or as described with reference to the example electronic device 500 shown in FIG. 5.

In the example system 100, the peripheral 104 is illustrated as a docking peripheral to which the electronic device 102 may be docked via the interface connection. The interface connection 106 can be implemented as any type of audio/video media connector via which the electronic device 102 communicates media data (e.g., audio data and/or video data) to the peripheral 104. In embodiments, the interface connection is implemented as a high-definition multimedia interface (HDMI). An HDMI connector provides an HD video plus audio interface connection via which the electronic device is coupled to the peripheral. Alternatively, the interface connection may be another type of audio/video media connector, or a combination of connectors, such as a coaxial cable that includes audio and video connectors, an RCA cable that includes video, right audio, and left audio connectors, or the combination of a VGA (video) cable along with a separate audio cable or connection. The audio data can be communicated to the peripheral via the same physical connector or port as the display data, or the audio data may be communicated to the peripheral via a different connector or port than the video data.

The display monitor 108 of the peripheral 104 can display a representation 114 of the electronic device display, such as an integrated display and/or touch-screen of the electronic device. Additionally, video 116, such as from an Internet television service or a streaming video, can be displayed for viewing on the display monitor 108 of the peripheral. The peripheral can also render audio from the speakers 110, such as audio from an Internet radio or music service that is rendered for user listening. The peripheral receives media data (e.g., audio data and/or video data) from the electronic device via the interface connection.

In implementations, the representation 114 of the electronic device display is generated from an application in a first runtime environment (e.g., an Android™ mobile view), and the peripheral display of the video 116 is generated from a different application in a second runtime environment on the electronic device. An electronic device that includes multiple runtime environments is further described with reference to FIG. 2.

In the example system 100, the electronic device 102 includes software applications 140, such as any one or combination of (but not limited to) a phone call/dialer application, a camera application for video or still images, audio recorder, MP3 player, audio file player, digital images viewer, audio/video player, etc. Depending on specific implementations and functions of the various software applications, the applications generally retrieve, process, and/or generate media data, such as video data 142 and/or audio data 144. Media data may also be accessed and communicated to the peripheral from memory in the electronic device, a DVD or removable flash memory, as an Internet streaming file, and the like.

The electronic device includes a media data monitor 150 and a power manager application 152. The media data monitor and the power manager application can each be implemented as computer-executable instructions, such as software applications, and executed by one or more processors to implement the various embodiments described herein. Note that the media data monitor and the power manager application may be implemented together as a software application or application modules. Alternatively, the media data monitor and the power manager application are implemented as independent software applications or as independent application modules.

The power manager application 152 is implemented to timeout the interface connection 106 between the electronic device 102 and the peripheral 104 if user interaction with the electronic device is not detected for a timeout duration 154. User interaction with the electronic device can be detected or received as a key-press, mouse or other pointing device input, touch-screen or touchpad input, etc. The power manager application may be a background software program, a power saver setting, a monitor power setting, a docking peripheral application, or a screensaver application where the timeout duration is a screensaver setting controlled by the power manager application. In various implementations, the power manager application can turn off an output port, stop data from being communicated or transferred, and/or turn off monitor hardware.

In embodiments, the media data monitor 150 is implemented to detect at 156 media data (e.g., audio data and/or video data) transferred through the interface connection 106, and initiate a reset of the timeout duration responsive to the media data being detected. For example, the media data monitor can detect the audio data 144 in an audio channel of the HDMI (e.g., interface connection 106) and initiate the reset of the timeout duration 154 by communicating a reset signal to the power manager application 152. The media data monitor can indicate that audio data is present or detected when communicated through the interface connection, and the power manager application 152 resets the timeout duration.

In implementations, the media data monitor 150 detects the audio data through the interface connection 106 and, based on the audio data being detected, communicates the detected audio data as an indication of user interaction to the power manager application 152 that resets the timeout duration. When the audio data is detected in the interface connection and the timeout duration is reset, the peripheral 104 can continue to render audio from the audio data 144 that is received from the electronic device 102 via the interface connection. Similarly, when the audio data is detected in the interface connection and the timeout duration is reset, the peripheral 104 can continue to display video from the video data 142 that is received from the electronic device via the interface connection.

Figure 2:
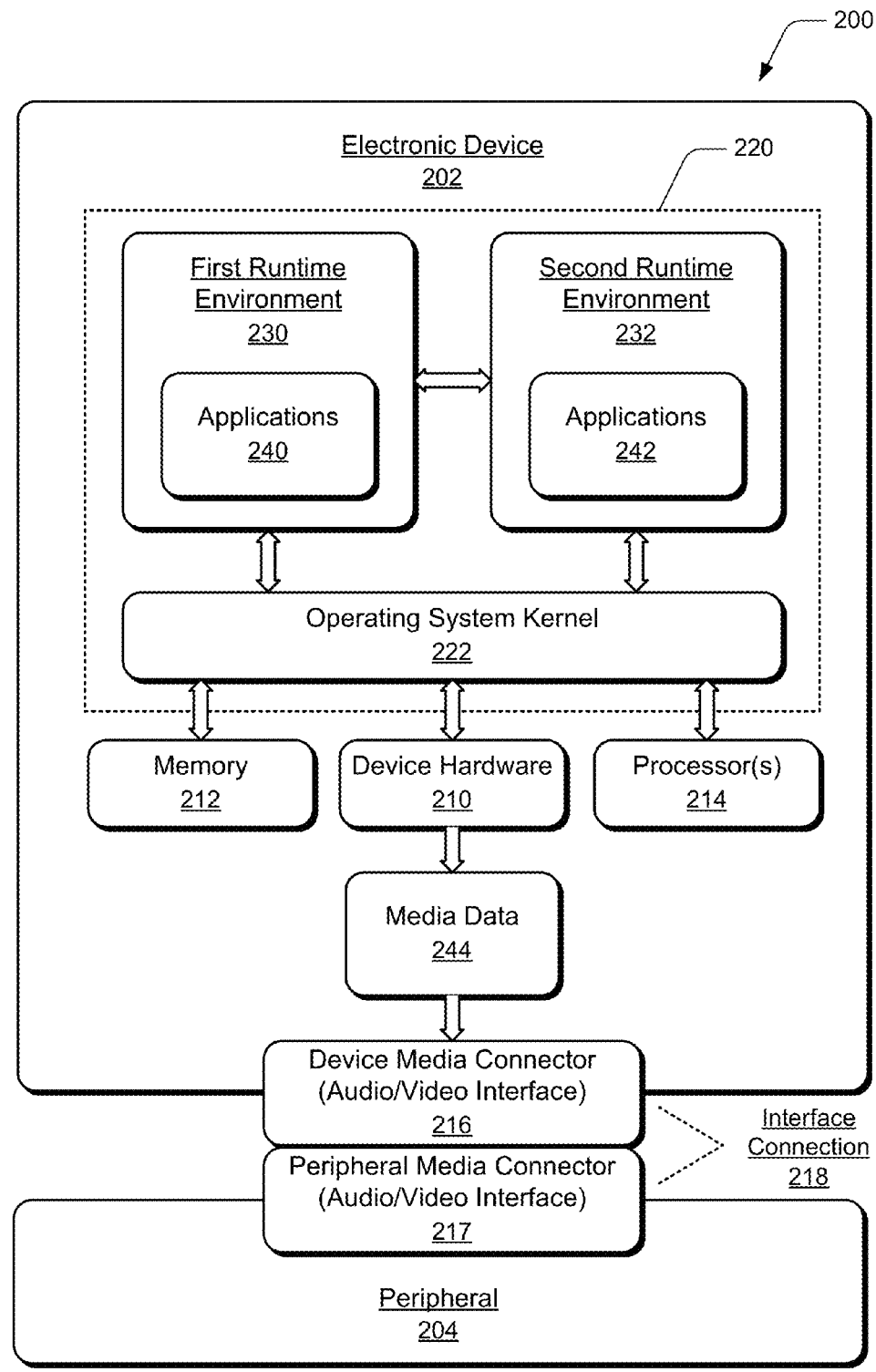
FIG. 2 illustrates an example system with an electronic device in which embodiments of system timeout reset based on media detection can be implemented.

FIG. 2 illustrates an example system 200 with an electronic device 202 and a peripheral 204 in which embodiments of system timeout reset based on media detection can be implemented. The electronic device 202 and/or the peripheral 204 can be implemented as described with reference to FIG. 1, and may be implemented with any combination of differing components as further described with reference to the example electronic device shown in FIG. 5.

The electronic device 202 includes device hardware 210, memory 212, one or more processors 214, and a device media connector 216, such as an audio/video media connector or interface. Similarly, the peripheral 204 includes a peripheral media connector 217, such as an audio/video media connector or interface. The electronic device 202 can then be coupled to the peripheral 204 via an interface connection 218 formed when the device media connector and the peripheral media connector are coupled for audio data and/or video data communication between the devices. The device hardware 210 may include media hardware, such as an audio speaker that renders audio when input with audio data, and may include a display component that displays video when input with video data. The memory 212 is implemented to store or otherwise maintain various data, such as audio data and/or video data. The memory can be implemented as any type of memory and/or suitable electronic data storage, including memory units removable from the electronic device, such as a flash memory data storage device (e.g., USB flash drive), a compact disk (CD), or a digital versatile disk (DVD).

In this example, the electronic device 202 includes elements of a hybrid operating system 220, such as an operating system kernel 222, as well as a first runtime environment 230 and a second runtime environment 232. The hybrid operating system may be implemented as a GNU/Linux operating system that includes a Linux Kernel (e.g., the operating system kernel), an Android™ runtime environment (e.g., the first runtime environment), and a GNU/Linux runtime environment (e.g., the second runtime environment). The operating system kernel 222 communicates and/or transfers data between the runtime environments and the device hardware 210, memory 212, and processors 214 of the electronic device. Implementations of a hybrid operating system are not limited to Linux-based systems and environments. Other operating systems can include Disk Operating System (DOS), Microsoft Windows™ operating systems, and Apple Mac OS™ operating systems. Additionally, alternate implementations can include more than two runtime environments of a hybrid operating system.

The runtime environments include software applications, such as Android applications 240 in the first runtime environment 230 and Ubuntu applications 242 in the second runtime environment 232. The software applications in the respective runtime environments may include any one or combination of the software applications described with reference to FIG. 1. As also previously described, the software applications generally retrieve, process, and/or generate the media data 244 (e.g., audio data and/or video data). The media data may also be accessed and communicated to the peripheral 204 from the memory 212 in the electronic device, from a DVD or removable flash memory, as an Internet streaming file, and the like. The media data 244 is communicated to the peripheral via the interface connection 218 (e.g., through the device media connector 216 that couples to the peripheral medial connector 217).

Example methods 300 and 400 are described with reference to respective FIGS. 3 and 4 in accordance with one or more embodiments of system timeout reset based on media detection. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
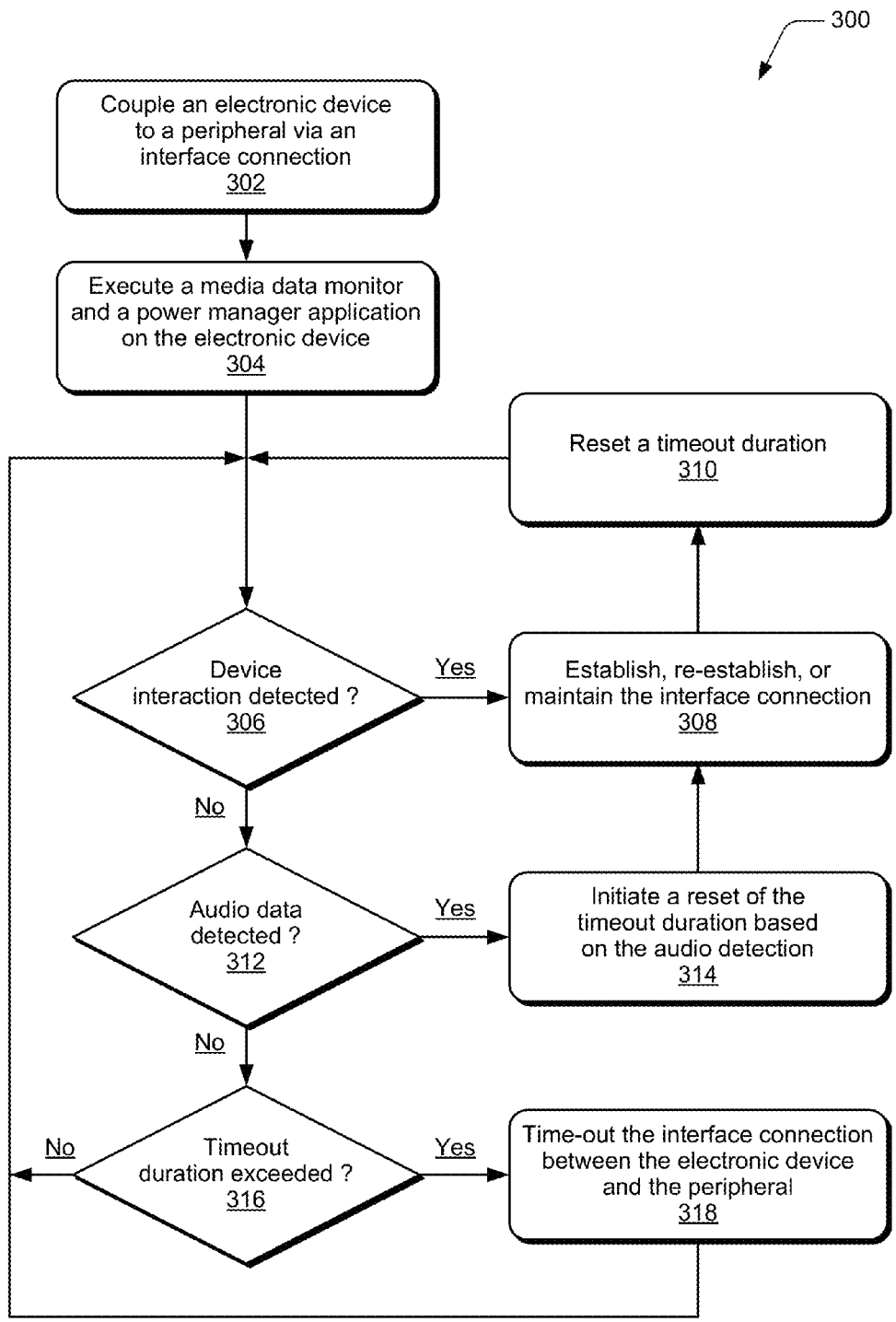
FIG. 3 illustrates example method(s) of system timeout reset based on media detection in accordance with one or more embodiments.

FIG. 3 illustrates example method(s) 300 of system timeout reset based on media detection, where media data is detected as audio data. The order in which the method blocks are described are not intended to be construed as a limitation, and any number or combination of the described method blocks can be combined in any order to implement a method, or an alternate method.

At block 302, an electronic device is coupled to a peripheral via an interface connection. For example, the electronic device 102 (FIG. 1) is coupled to the peripheral 104 via the interface connection 106. In implementations, the interface connection is a high-definition multimedia interface (HDMI) that couples the electronic device to the peripheral. Alternatively, the interface connection may be another type of audio/video media connector, or a combination of connectors. Coupling the electronic device to the peripheral includes the peripheral receiving media data (e.g., audio data and/or video data) from the electronic device via the interface connection. The peripheral renders audio from audio data received as the media data from the electronic device and/or the peripheral renders video data received as the media data from the electronic device. In another embodiment, the peripheral can capture media data for storage at the electronic device (e.g., a microphone for creating audio data and a camera for creating video data).

At block 304, a media data monitor and a power manager application are executed on the electronic device. For example, the electronic device 102 includes the media data monitor 150 and the power manager application 152 that may be executed as software applications to implement system timeout reset based on media detection. As noted above, the order in which the method blocks are described are not intended to be construed as a limitation, and the media data monitor and/or the power manager application may be initiated at block 304, or may already be running as services or background processes before the electronic device is coupled to the peripheral at block 302.

At block 306, a determination is made as to whether user interaction with the electronic device is detected. For example, the power manager application 152 detects user interaction with the electronic device 102 to preclude a timeout of the interface connection 106 between the electronic device and the peripheral. User interaction may be detected or received as a key-press, mouse or other pointing device input, touch-screen or touchpad input, etc. Another detectable user interaction may be an audio input to the peripheral from a microphone, and the audio can be picked-up as a signal to reset the timeout duration. The power manager application may be implemented as described with reference to FIG. 1, such as a screensaver application where the timeout duration 154 is a screensaver setting controlled by the power manager application.

If user interaction with the electronic device is detected (i.e., "yes" from block 306), then at block 308, the interface connection between the electronic device and the peripheral is established, re-established, or maintained. The timeout duration is then reset at block 310. For example, the power manager application 152 resets the timeout duration 154 and the interface connection between the electronic device and the peripheral is maintained. If user interaction with the electronic device is not detected (i.e., "no" from block 306), then at block 312, a determination is made as to whether audio data is detected in an audio channel of the interface connection. For example, the media data monitor 150 detects the audio data at 156 when the audio data is transferred through the interface connection 106, such as in an audio channel of an HDMI connector.

If audio data is detected in an audio channel of the interface connection (i.e., "yes" from block 312), then at block 314, a reset of the timeout duration is initiated based on detecting the audio. For example, the media data monitor 150 communicates a reset signal to the power manager application 152 based on the audio data being detected in the interface connection. The method then continues at block 308 where the interface connection between the electronic device and the peripheral is established, re-established, or maintained, and the timeout duration is then reset at block 310.

Note that detection of the audio data at block 312—and not user interaction—is used to initiate the reset of the timeout duration at block 310, which may then maintain the display of a video on the peripheral. For example, if the peripheral is rendering video data when the audio data and the video data are received from the electronic device via the interface connection, the video will continue to be displayed at the peripheral when the timeout duration is reset based on detecting the audio data. Similarly, if the peripheral is rendering audio from the audio data received from the electronic device via the interface connection, then rendering the audio continues when the timeout duration is reset based on detecting the audio data.

If the audio data is not detected through the interface connection (i.e., "no" from block 312), then at block 316, a determination is made as to whether the timeout duration has been exceeded. If the timeout duration has been exceeded (i.e., "yes" from block 316), then at block 318, the interface connection between the electronic device and the peripheral is timed-out. The method then continues at block 306 to determine whether user interaction with the electronic device is detected, in which case the interface connection between the electronic device and the peripheral can be re-established at block 308. If the timeout duration has not been exceeded (i.e., "no" from block 316), then the method also continues at block 306 to determine whether user interaction with the electronic device is detected, in which case the interface connection between the electronic device and the peripheral can be maintained at block 308.

Figure 4:
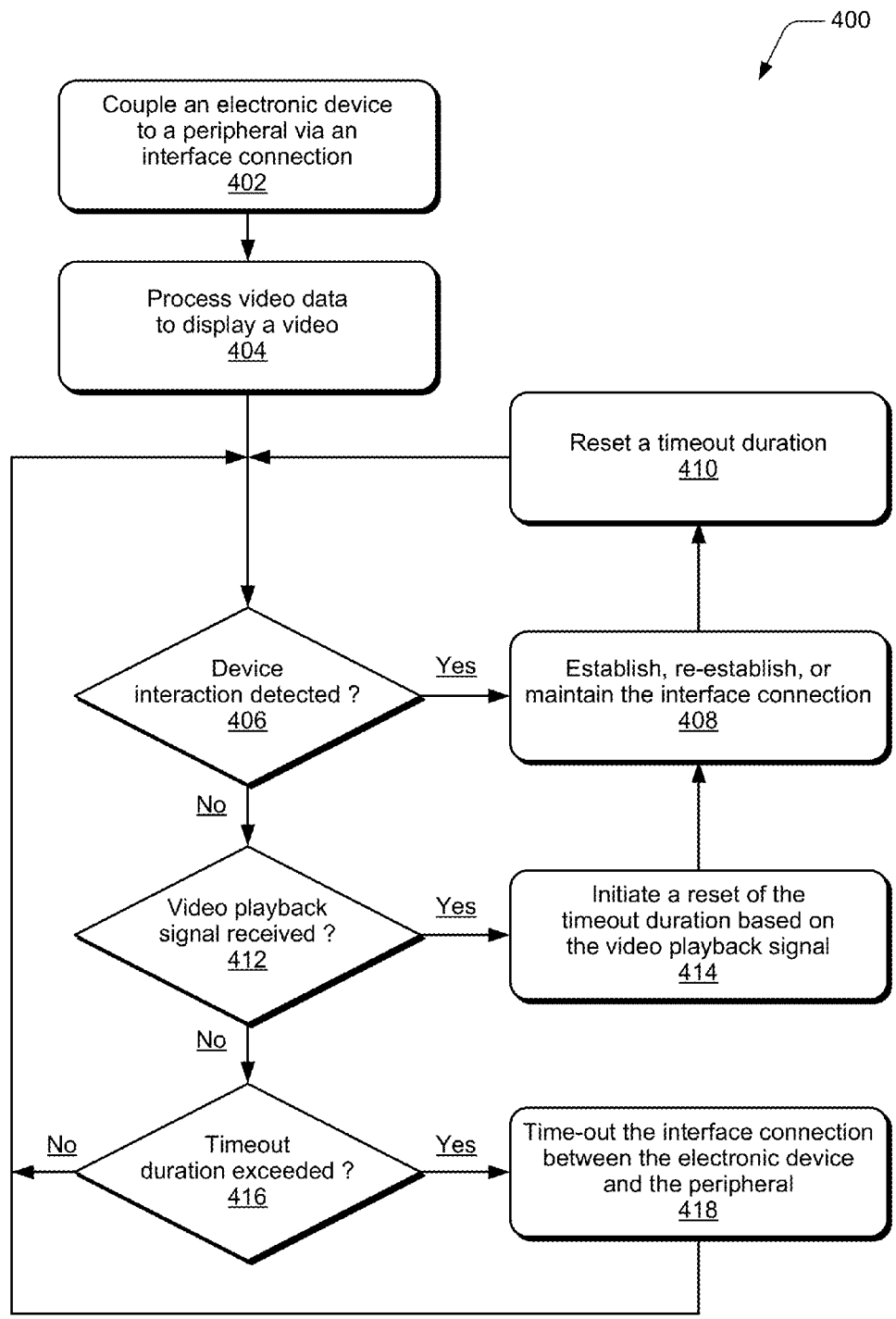
FIG. 4 illustrates example method(s) of system timeout reset based on media detection in accordance with one or more embodiments.

FIG. 4 illustrates example method(s) 400 of system timeout reset based on media detection, where media data is detected as video data. The order in which the method blocks are described are not intended to be construed as a limitation, and any number or combination of the described method blocks can be combined in any order to implement a method, or an alternate method.

At block 402, an electronic device is coupled to a peripheral via an interface connection. For example, the electronic device 102 (FIG. 1) is coupled to the peripheral 104 via the interface connection 106. In implementations, the interface connection is a high-definition multimedia interface (HDMI) that couples the electronic device to the peripheral. At block 404, video data is processed to display video. For example, a software application 140 in a runtime environment on the electronic device 102 retrieves, processes, and/or generates media data, such as video data 142 that is then communicated to the peripheral 104 via the interface connection 106.

At block 406, a determination is made as to whether user interaction with the electronic device is detected. For example, the power manager application 152 detects user interaction with the electronic device 102 to preclude a timeout of the video display. If user interaction with the electronic device is detected (i.e., "yes" from block 406), then at block 408, the interface connection between the electronic device and the peripheral is established, re-established, or maintained. The timeout duration is then reset at block 410. For example, the power manager application 152 resets the timeout duration 154 and the interface connection between the electronic device and the peripheral is maintained.

If user interaction with the electronic device is not detected (i.e., "no" from block 406), then at block 412, a determination is made as to whether a video playback signal is received. For example, if the audio that corresponds to the video being displayed is muted (e.g., television content may be displayed with the audio muted and closed-captioning turned on), then the audio data is not transferred via the interface connection and will not be detectable by the media data monitor at 156. Under those circumstances, the timeout duration will be exceeded according to the method shown in FIG. 3, such as after thirty minutes when no user interaction is detected. Accordingly, in the method shown in FIG. 4, the power manager application 152 can receive a video playback signal or other similar indication of video activity on a separate video channel (e.g., different than display data for a still or dynamic background-wallpaper display or desktop display). A video playback application can be implemented to generate and communicate the video playback signal to the power manager application to indicate the separate video channel.

If a video playback signal is received (i.e., "yes" from block 412), then at block 414, a reset of the timeout duration is initiated based on the video playback signal. At block 408, the interface connection between the electronic device and the peripheral is established, re-established, or maintained, and the timeout duration is then reset at block 410. Note that a video playback signal is received at block 412, and the video playback signal is then used to initiate the reset of the timeout duration at block 410, which may then maintain the display of a video on the peripheral.

If a video playback signal is not received (i.e., "no" from block 412), then at block 416, a determination is made as to whether the timeout duration has been exceeded. If the timeout duration has been exceeded (i.e., "yes" from block 416), then at block 418, the interface connection between the electronic device and the peripheral is timed-out. The method then continues at block 406 to determine whether user interaction with the electronic device is detected, in which case the interface connection between the electronic device and the peripheral can be re-established at block 408. If the timeout duration has not been exceeded (i.e., "no" from block 416), then the method also continues at block 406 to determine whether user interaction with the electronic device is detected, in which case the interface connection between the electronic device and the peripheral can be maintained at block 408.

Figure 5:
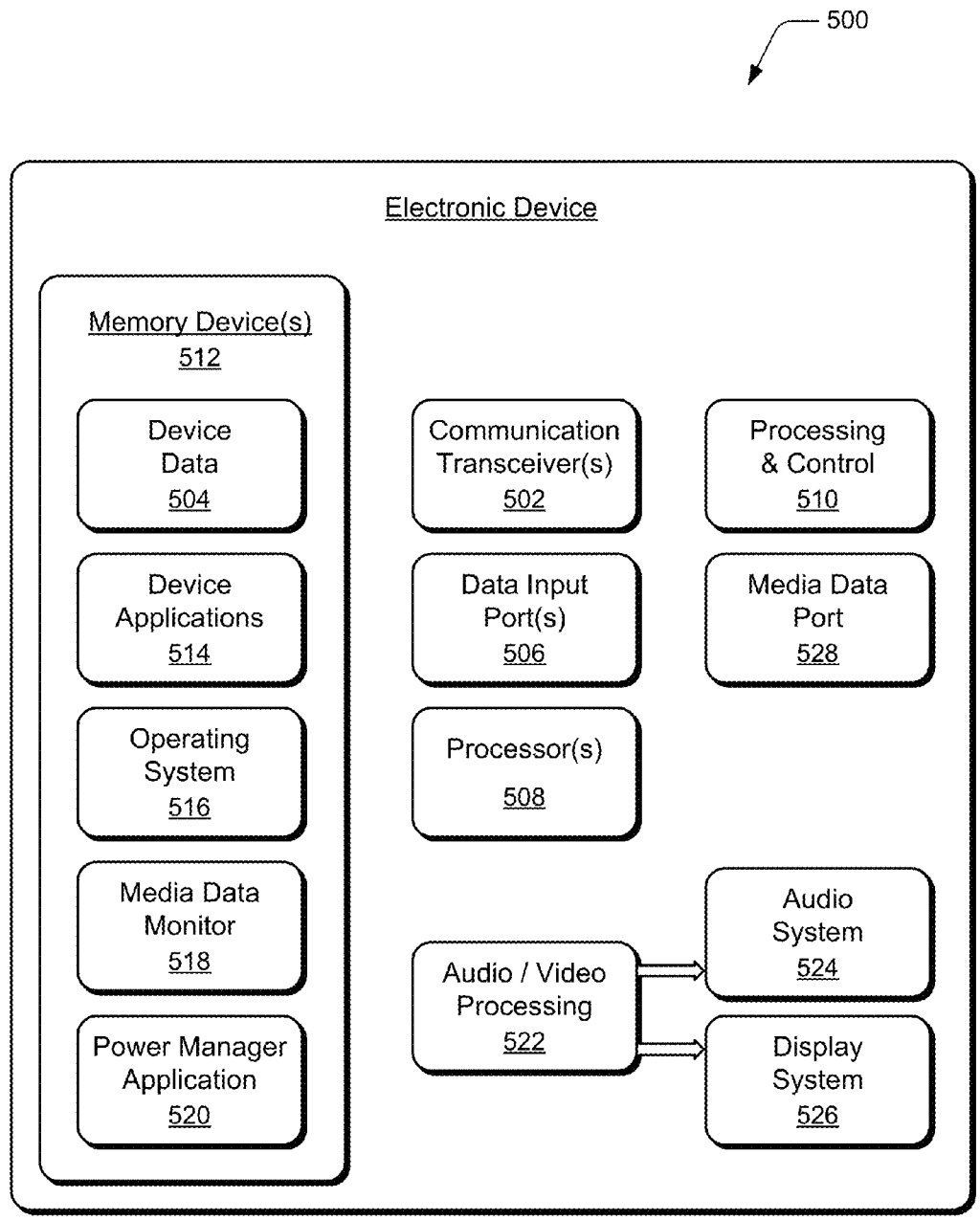
FIG. 5 illustrates various components of an example electronic device that can implement embodiments of system timeout reset based on media detection.

FIG. 5 illustrates various components of an example electronic device 500 that can be implemented as any device described with reference to any of the previous FIGS. 1-4. The electronic device may be implemented as any one or combination of a fixed or mobile device, in any form of a consumer, computer, portable, user, communication, phone, navigation, gaming, media playback, and/or electronic device.

The electronic device 500 includes communication transceivers 502 that enable wired and/or wireless communication of device data 504, such as received data, data that is being received, data scheduled for broadcast, data packets of the data, etc. Example transceivers include wireless personal area network (WPAN) radios compliant with various IEEE 802.15 (sometimes referred to as Bluetooth™) standards, wireless local area network (WLAN) radios compliant with any of the various IEEE 802.11 (sometimes referred to as WiFi™) standards, wireless wide area network (WWAN) radios for cellular telephony, wireless metropolitan area network (WMAN) radios compliant with various IEEE 802.15 (sometimes referred to as WiMAX™) standards, and wired local area network (LAN) Ethernet transceivers.

The electronic device 500 may also include one or more data input ports 506 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors)

for flash memory, DVDs, CDs, and the like. These data input ports may be used to couple the electronic device to components, peripherals, or accessories such as microphones or cameras.

The electronic device 500 includes one or more processors 508 (e.g., any of microprocessors, controllers, and the like), which process computer-executable instructions to control operation of the device. Alternatively or in addition, the electronic device can be implemented with any one or combination of software, hardware, firmware, or fixed logic circuitry that is implemented in connection with processing and control circuits, which are generally identified at 510. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 500 also includes one or more memory devices 512 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The electronic device 500 may also include a mass storage media device.

A memory device 512 provides data storage mechanisms to store the device data 504, other types of information and/or data, and various device applications 514 (e.g., software applications). For example, an operating system 516 can be maintained as software instructions within a memory device and executed on the processors 508. The device applications may also include a device manager, such as any form of a control application, software application, signal-processing and control module, code that is native to a particular device, a hardware abstraction layer for a particular device, and so on. In embodiments, the electronic device also includes a media data monitor 518 and a power manager application 520 to implement system timeout reset based on media detection.

The electronic device 500 also includes an audio and/or video processing system 522 that generates audio data for an audio system 524 and/or generates display data for a display system 526. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 528. In implementations, the audio system and/or the display system are external components to the electronic device. Alternatively, the audio system and/or the display system are integrated components of the example electronic device, such as an integrated touch-screen.

As described above, audio data through an interface connection with a peripheral can be detected, and rather than a user having to periodically move a mouse or provide some other input to the electronic device, the detection of the audio data is used as the basis to reset a timeout duration and prevent a screensaver from activating when a video is being displayed. Additionally, the user does not have to manually adjust monitor and/or screensaver settings on the electronic device. Although embodiments of system timeout reset based on media detection have been described in language specific to features and/or methods, the subject of the appended claims is not necessarily limited to the specific features or methods described. Rather, the specific features and methods are disclosed as example implementations of system timeout reset based on media detection.

The invention claimed is:

1. An electronic device, comprising:
a high-definition multimedia interface (HDMI) connection comprising an audio channel and a video channel that is separate from the audio channel, the HDMI connection configured to be coupled to a peripheral that includes a display monitor;
a processor configured to execute a power manager application to timeout the HDMI connection if user interaction with the electronic device is not detected for a timeout duration; and
a media data monitor configured to initiate a reset of the timeout duration responsive to audio data being detected in the audio channel of the HDMI connection and irrespective of data being detected in the video channel of the HDMI connection.

2. The electronic device as recited in claim 1, wherein the electronic device is configured to communicate the audio data to the peripheral via the HDMI connection, and wherein an audio speaker of the peripheral is configured to render audio from the audio data and the audio continues to be rendered if the audio data is detected to initiate the reset of the timeout duration.

3. The electronic device as recited in claim 1, wherein the electronic device is configured to communicate video data to the peripheral via the video channel of the HDMI connection, and wherein the display monitor is configured to display a video from the video data and the video continues to be rendered if the audio data is detected to initiate the reset of the timeout duration.

4. The electronic device as recited in claim 1, wherein the timeout duration is a screensaver setting controlled by the power manager application that is executed on the electronic device.

5. The electronic device as recited in claim 1, wherein the media data monitor is configured to detect the audio data and, based on the audio data being detected, communicate an indication of the user interaction to the power manager application that resets the timeout duration.

6. The electronic device as recited in claim 1, wherein the HDMI connection is configured as an audio/video media connector, and wherein the electronic device is configured to communicate the audio data and video data to the peripheral via the audio/video media connector.

7. The electronic device as recited in claim 1, wherein the media data monitor is configured to detect the audio data as the user interaction, and communicate an indication of the user interaction based on the detected audio data to the power manager application to initiate the reset of the timeout duration.

8. A method, comprising:
coupling an electronic device to a peripheral via a high-definition media interface (HDMI) connection configured to transfer media data between the electronic device and the peripheral, the HDMI connection comprising an audio channel and a video channel that is separate from the audio channel, and the media data comprising audio data and video data;

timing out the HDMI connection if user interaction with the electronic device is not detected for a timeout duration; and initiating a reset of the timeout duration based on detecting the audio data in the audio channel of the HDMI connection and irrespective of detecting the video data in the video channel of the HDMI connection.

9. The method as recited in claim 8, wherein coupling the electronic device includes:

the peripheral rendering audio from the audio data received as the media data from the electronic device via the audio channel of the HDMI connection, and wherein rendering the audio continues when the timeout duration is reset based on detecting the audio data.

10. The method as recited in claim 8, wherein coupling the electronic device includes:

the peripheral rendering the video data when the audio data and the video data are received as the media data from the electronic device via the HDMI connection, and wherein the video data continues to be displayed when the timeout duration is reset based on detecting the audio data.

11. The method as recited in claim 8, further comprising:

executing a media data monitor on the electronic device, the media data monitor detecting the audio data and communicating a reset command to a power manager application that is executing on the electronic device to reset the timeout duration.

12. The method as recited in claim 8, wherein the audio data is detected and, based on the audio data being detected in the audio channel of the HDMI connection, an indication of the user interaction is communicated to initiate the reset of the timeout duration.

13. The method as recited in claim 8, wherein the HDMI connection is configured as an audio/video media connector, and wherein coupling the electronic device includes the peripheral receiving the media data as the audio data and the video data from the electronic device via the audio/video media connector.

14. An electronic device, comprising:

a media connector configured to be coupled to a peripheral via a high-definition media interface (HDMI) connection comprising an audio channel and a video channel that is separate from the audio channel;

at least a memory and a processor configured to execute a power manager application and a media data monitor;

the power manager application configured to timeout the HDMI connection if user interaction with the electronic device is not detected for a timeout duration; and the media data monitor configured to initiate a reset of the timeout duration responsive to audio data being detected in the audio channel of the HDMI connection and irrespective of data being detected in the video channel of the HDMI connection.

15. The electronic device as recited in claim 14, wherein the electronic device is configured to communicate the media data as the audio data to the peripheral via the audio channel of the HDMI connection, and wherein the peripheral renders audio from the audio data and the audio continues to be rendered if the audio data is detected to initiate the reset of the timeout duration.

16. The electronic device as recited in claim 14, wherein the electronic device is configured to communicate the media data as the video data and the audio data to the peripheral via the HDMI connection, and wherein the peripheral continues to display a video if the audio data is detected to initiate the reset of the timeout duration.

17. The electronic device as recited in claim 14, wherein the timeout duration is a screensaver setting controlled by the power manager application.

18. The electronic device as recited in claim 14, wherein the media data monitor is configured to detect the audio data and, based on the audio data being detected in the audio channel of the HDMI connection, communicate an indication of the user interaction to the power manager application to initiate the reset of the timeout duration.

\* \* \* \* \*